United States Patent Office 3,149,669
Patented Sept. 22, 1964

3,149,669
SECONDARY OIL RECOVERY PROCESS
George G. Binder, Jr., Clark, N.J., and Charles D. Russell, Tulsa, Okla., assignors to Jersey Production Research Company, a corporation of Delaware
No Drawing. Filed Dec. 1, 1958, Ser. No. 777,211
10 Claims. (Cl. 166—9)

The present invention is broadly concerned with the recovery of oil from subterranean oil reservoirs. More particularly, the invention concerns an improved procedure in which a viscous fluid is employed as the driving medium. The invention especially relates to a method of oil recovery in which a viscous water-in-oil emulsion is used to displace the oil.

It is a well known practice in the petroleum industry, when an underground oil reservoir lacks sufficient natural oil driving means to maintain an economical oil production rate, to inject an oil displacing fluid into the reservoir. Thus, it has been the practice for some time to inject a gas or water into one or more injection wells within a reservoir so as to displace oil from the reservoir through one or more production wells. Methods of this type are generally referred to as methods of secondary recovery. The particular technique of using water is generally described as waterflooding. The present invention relates particularly to the technique of "flooding."

While conventional waterflooding is effective in obtaining additional oil from subterranean oil reservoirs, it has a number of shortcomings which detract seriously from its value. Foremost among these shortcomings is the tendency of flood water to "finger" through a reservoir and to bypass substantial portions of the reservoir. In other words, a water drive has a less than perfect "sweep" efficiency in that it does not contact all portions of a reservoir. Furthermore, it does not normally displace as much oil from the portions of a reservoir which it contacts as it theoretically is capable of doing.

This fingering tendency of a waterflood is usually explained by the fact that oil reservoirs possess regions and strata that have different permeabilities. The water flows more rapidly through those regions and strata having a greater relative permeability to water than for other portions of the reservoir. Water flooding often completely misses substantial portions of a reservoir. The net result is an inefficient oil displacement action on the part of the water.

At this point, it should be noted that crude oils vary greatly in viscosity—some being as low as 1 or 2 cps. and some ranging up to 1000 cps. or even more. It has been established that waterflooding performs less satisfactorily with viscous crude oils than with relatively non-viscous oils. In other words, the fingering and bypassing tendencies of a water drive are more or less directly related to the ratio of the viscosity of the reservoir oil to the viscosity of the aqueous driving medium.

Also of interest at this point is a mathematical relationship that has been developed in recent years to help explain the behavior of fluids flowing through porous media such as oil reservoirs. When this equation is applied to a "flooding" type operation within an oil reservoir, it reads as follows:

$$\frac{M_o}{M_e} = \frac{\mu_e}{\mu_o} \cdot \frac{K_o}{K_e}$$

where $M_o$ is the mobility of the oil to the reservoir in question.
$M_e$ is the mobility of the driving fluid to the reservoir in question.
$\mu_o$ is the viscosity of the driven oil.
$\mu_e$ is the viscosity of the driving fluid.
$K_e$ is the relative permeability of the reservoir toward the driving fluid in the presence of residual oil.
$K_o$ is the relative permeability of the reservoir toward the oil in the presence of interstitial water.

This equation is perhaps best explained by stating that when the mobility ratio of oil to the driving fluid within a reservoir is equal to 1, the oil and driving fluid move through the reservoir with equal ease. Substantially equilibrium proportions of driving fluid and oil remain within the reservoir as soon as the driving fluid has passed therethrough. Expressed otherwise, the mobility ratio term affords a measure of the volume of driving fluid and the amount of time that are required to reduce the oil content of the reservoir to an ultimate equilibrium value. For example, a given volume of driving fluid operating at a mobility ratio of 1 will displace a markedly greater volume of oil from a reservoir than will an equal volume of driving fluid operating at a mobility of less than 1.

Several procedures have been suggested to date for improving the mechanics of waterflooding type procedures particularly with the view to reducing the degree of fingering and bypassing. One suggestion has been to increase the viscosity of the water drive relative to the oil by incorporating water-soluble viscous agents within the water. Materials that have been suggested for this purpose include a wide variety of naturally occurring gums, sugars, and polymers. While these materials are effective to an extent in increasing the viscosity of flood water, they are also characterized by serious disadvantages. For example, some of the materials have a tendency to plug formations; some are relatively unstable; and some have relatively little thickening effect. Additionally, many of these materials are quite expensive and their use is not feasible from the standpoint of economics.

Accordingly, it is an object of this invention to provide an improved type of displacement process in which a marked increase in the viscosity of the driving fluid may be readily attained. It is also an object of the invention to provide a viscous displacing fluid in which the increased viscosity is attained inexpensively. It is still a further object of the invention to use a driving fluid whose viscosity is stable and can be adjusted over a wide range.

These and related objects which will be expressly discussed, or readily apparent from the following description, are realized in accordance with this invention by use of a viscous water-in-oil emulsion. The water-in-oil emulsion may comprise the entire body of driving fluid or alternatively it may be only a portion of the driving fluid. In the latter event, however, the water-in-oil emulsion should be incorporated within the front portion of the flood. In any case the water-in-oil emulsion should be located within the leading portion of the fluid drive in order that the effect of the resulting viscosity increase may be fully exploited.

When the water-in-oil emulsion is only incorporated within the leading portion of the fluid drive, the quantity of water-in-oil emulsion should be sufficient to prevent the trailing relatively non-viscous water from breaking through the water-in-oil emulsion and contacting the reservoir oil directly. The minimum quantity of water-in-oil emulsion to be used as a bank in front of the driving water in any given reservoir will depend upon such well recognized factors as the flooding pattern, the distance between wells, the viscosity of the oil, etc. In most reservoirs it is contemplated that the volume of water-in-oil emulsion should be at least about 25% of the pore volume of the reservoir contacted by the emulsion. As to the portion of a reservoir contacted by the emulsion, it is assumed that the pore volume contacted is normally in the range of about 75–95% of the pore volume of the reservoir (or portion thereof) being flooded. Since it is conventional practice to carry out flooding operations using certain regular flooding patterns, it may be convenient in such instances to define the volume of the reservoir under flood as the volume underlying the lateral area defined by one or more patterns. To illustrate, in "line drive floods" it is assumed that the pore volume contacted is normally in the range of about 75–95% of the pore volume of the reservoir underlying the lateral area between the line of injection wells and the line of producing wells.

With respect to the water-in-oil emulsion to be employed in this invention, the emulsion may be prepared in any conventional way. The viscosity may vary as desired but it is generally preferred that the viscosity not exceed about 1000 centipoises in any case.

It will be noted that the displacement of oil by a water-in-oil emulsion may be referred to as a miscible-like displacement system. In a miscible system $K_o$ and $K_e$ are equal. Therefore the mobility ratio $$\left(\frac{M_o}{M_e}\right)$$

of the oil to the driving medium is equal to $$\left(\frac{\mu e}{\mu o}\right)$$

the ratio of the viscosity of the driving medium to the viscosity of the oil. As it is desired to have $$\frac{M_o}{M_e}$$

approximately one it is seen that the viscosity of the driving fluid, in miscible displacement processes, be approximately equal to the viscosity of the oil in the reservoir. Therefore the desired viscosity of the water-in-oil emulsion will preferably be in the range of from about 2 cps. to about 1000 cps. However, from a practical viewpoint the emulsion preferably should have a viscosity of at least about 4 cps. at 60° F.

Wherever possible and feasible, considering reservoir conditions etc., it is normally preferred that the viscosity of the emulsion be adjusted such that the mobility ratio of the emulsion and the reservoir oil approaches a value of one. It is to be noted that usually mobility ratios of greater than one return very little in the way of additional oil recoveries; but at ratios less than one, oil recoveries fall off quite rapidly. The amount of water by weight may vary from about 20 to about 1 times the weight of the oil in the emulsion. However, it is normally preferred that there be about 8 times as much water as oil in the emulsion. An emulsifier is preferably used to stabilize the emulsion. The emulsifier will normally comprise between about 0.1 and about 4% of the weight of the emulsion.

The water used in the emulsion may be fresh water, brackish water, or water similar to that in the reservoir. The oil used in the emulsion may be crude oil or even light oil such as naphtha and kerosenes. Suitable emulsifying agents are sorbtan mono-oleate, oil soluble alkyl phenol polyglycol ether, calcium oleate, benzyl cellulose, lanolin. In regard to emulsifying agents reference is made to Emulsions, Theory and Practice, by Becher and published by Reinhold Publishing Corporation, New York, N.Y., copyrighted 1957. Reference is made especially to page 189 thereof which describes the HLB method (hydrophile-lipophile balance). This method is an aid in determining which agents are suitable as emulsifiers for preparation of water-in-oil emulsions. The water-in-oil emulsion may be formed by any of many conventional methods such as forcing the water, crude oil, air (if desired), and emulsifier under pressure through a small orifice or homogenization nozzle.

In carrying out the method of the invention, any given reservoir is provided in a conventional manner with a predetermined number of injection wells and production wells. It will be noted at this point that the invention is adapted to line drive flooding techniques as well as to the techniques that employ five-spot patterns, seven-spot patterns, and the like.

After the desired number of injection and production wells have been prepared, the water-on-oil emulsion is introduced into the oil reservoir through the injection wells. As noted earlier, the viscosity of the solution is preselected preferably such that the mobility ratio of the emulsion to the reservoir oil is approximately one.

When speaking of the viscosities of the emulsion and the reservoir oil, the viscosities referred to are those existing within the reservoir. The temperature of the reservoir of course has a bearing upon these values.

The viscosity of the reservoir oil may be determined in a conventional manner e.g., by obtaining an actual sample of the oil, or by reconstituting a sample of the oil and thereafter determining its viscosity value.

The relative permeabilities of the reservoir to oil and to the emulsion may also be obtained in a conventional manner, e.g., by measurement made on a core sample of the formation.

As mentioned earlier, the emulsion may be injected as a relatively narrow bank; but it is necessary that the bank be sufficiently large that water breakthrough (i.e., through the bank) may not occur until the reservoir has been traversed by the emulsion from the injection wells to the production wells. Conventional waterflooding rates may be used, for example, about 0.2 to 2 feet of linear movement through the reservoir per day. Once the desired volume of emulsion has been injected into the reservoir, flood water in the form of fresh water, salt water, or the like may be injected as in a conventional waterflooding program. The waterflood is continued until whatever practical amounts of oil have been withdrawn from the reservoir. At this time the waterflood may be discontinued.

As an example, a test, which is described below, has been conducted which shows the effectiveness of a water-in-oil emulsion as a driving fluid. The emulsion consisted by weight of 73 percent water (fresh), 25 percent soltrol which is a light grade of kerosene consisting predominantly of hydrocarbons in the $C_{10}$ to $C_{12}$ range, and 2 percent emulsifying agent (Armour RD-2351-P, a fatty acid derivative emulsifying agent more fully described in U.S. Patent No. 2,840,600 as Example 15, manufactured by Armour and Company, 1355 W. 31st., Chicago 9, Ill.). The viscosity of this emulsion was about 400 cps. The sand pack through which this emulsion was driven was ¾" in diameter, 2' long, and had a permeability of 13 darcys. The sand pack was saturated with 60 cps. refined oil and connate water. The connate water was fresh and occupied 23 percent of the pore volume. Recovery using the water-in-oil emulsion was 88 percent of the initial oil in the model after 2.2 hydrocarbon volume throughput. Recovery for a regular waterflood through this model was 55 percent of the initial oil therein. Even after 11 hydrocarbon volume throughput of the regular waterflood, the recovery was only 71 percent. The emulsion did not break, but the viscosity was decreased near the leading edge of the emulsion front because of dilution by the connate water. This data clearly presents the superiority of water-in-oil emulsion over conventional waterflooding techniques.

It will be recognized that a number of variations in this procedure may be employed without departing from the spirit or scope of the invention. Thus, it is contemplated that at least a portion of the viscous emulsion may be withdrawn from the reservoir at various points and recycled or returned to the reservoir at prior points within the reservoir. Any recycled solution should preferably be returned to a later point in the bank of the emulsion although this is not entirely necessary since beneficial results may still be derived from the recycle operation even though return to the bank itself is not realized.

The invention claimed is:

1. A process for displacing oil from a subterranean oil reservoir which comprises injecting an emulsion of water-in-oil within the reservoir through an input well in a quantity sufficient to displace oil from at least a portion of the reservoir and recovering displaced oil from an output well spaced from the input well.

2. A process as defined in claim 1 in which the quantity of emulsion injected is at least about 25 percent of the pore volume of the reservoir portion contacted by the emulsion.

3. A method as defined in claim 1 in which the mobility ratio of the emulsion to the reservoir oil is adjusted to be approximately one.

4. A process as defined in claim 1 in which the concentration of water within the emulsion is at least about 60 percent by weight of the emulsion but less than that required to give the emulsion a viscosity of about 1000 centipoises.

5. A process for displacing oil from a subterranean oil reservoir which comprises injecting a water-in-oil emulsion through an input well into a reservoir, with said emulsion having a viscosity in the range of from about 4 cps. to about 1000 cps. and in a quantity sufficient to displace oil from at least a portion of the reservoir to an output well spaced from the input well.

6. A process as defined in claim 1 in which an emulsifying agent comprising between about 0.1 and about 4.0 percent of the weight of the emulsion has been added thereto.

7. A process for recovering oil from a subterranean oil reservoir which comprises: injecting a water-in-oil emulsion through an input well into a reservoir, said emulsion having a viscosity in the range of from about 4 cps. to about 1,000 cps.; driving said emulsion through said reservoir to displace oil from at least a portion of the reservoir; and recovering displaced oil from an output well spaced from the input well.

8. A process as defined in claim 7 in which the quantity of emulsion injected is at least about 25% of the pore volume of the reservoir portion contacted by the emulsion.

9. A process as defined in claim 7 in which a second driving fluid is injected through said input well to force said emulsion through said reservoir.

10. A method as defined in claim 7 in which the mobility ratio of the emulsion to the reservoir oil is adjusted to be approximately 1.

References Cited in the file of this patent

UNITED STATES PATENTS

| | | |
|---|---|---|
| 2,356,205 | Blair et al. | Aug. 22, 1944 |
| 2,596,137 | Fast | May 13, 1952 |
| 2,689,009 | Brainerd et al. | Sept. 14, 1954 |
| 2,731,414 | Binder et al. | Jan. 17, 1956 |
| 2,800,962 | Garst | July 30, 1957 |
| 2,920,041 | Meadors | Jan. 5, 1960 |
| 2,927,637 | Draper | Mar. 8, 1960 |
| 2,988,142 | Maly | June 13, 1961 |

OTHER REFERENCES

Text-Book of Physical Chemistry, by Glasstone, published by D. Van Nostrand Co., Inc. Copyright 1940, pages 1225 and 1251.

Becher, P., "Emulsions: Theory and Practice," pages 46–47, New York, Reinhold Publishing Corp., 1957.